(12) United States Patent
Iyer et al.

(10) Patent No.: US 11,451,407 B1
(45) Date of Patent: Sep. 20, 2022

(54) MANAGING A USER'S MEETING ACROSS MULTIPLE CLIENT COMPUTING DEVICES

(71) Applicant: Dell Products L.P., Round Rock, TX (US)

(72) Inventors: Vivek Viswanathan Iyer, Austin, TX (US); Gokul Thiruchengode Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/476,551

(22) Filed: Sep. 16, 2021

(51) Int. Cl.
*H04L 12/18* (2006.01)
*G06F 13/10* (2006.01)

(52) U.S. Cl.
CPC ........ *H04L 12/1818* (2013.01); *G06F 13/102* (2013.01); *H04L 12/1822* (2013.01)

(58) Field of Classification Search
CPC ............. H04L 12/1818; H04L 12/1822; G06F 13/102
See application file for complete search history.

(56) References Cited

U.S. PATENT DOCUMENTS

| 8,626,847 | B2* | 1/2014 | Jones | H04L 12/1822 |
| | | | | 709/206 |
| 9,819,902 | B2* | 11/2017 | Rintel | H04N 7/147 |
| 10,834,147 | B1* | 11/2020 | Wehrung | H04L 67/025 |
| 2017/0331904 | A1* | 11/2017 | Padhye | H04W 4/50 |
| 2021/0337364 | A1* | 10/2021 | Biddala | H04W 4/027 |

* cited by examiner

*Primary Examiner* — Esther B. Henderson
*Assistant Examiner* — Nazia Naoreen
(74) *Attorney, Agent, or Firm* — Kirton McConkie; Brian Tucker

(57) ABSTRACT

A user's meeting can be managed across multiple client computing devices. A client service can be employed on client computing devices that a user may use to participate in meetings. The client services can interface with a web service to enable the web service to manage the user's meetings when the user may use multiple client computing devices during the meeting. This management can include switching the meeting from one client computing device to another based on context or managing the peripherals available at multiple client computing devices that the user may simultaneously use to participate in the meeting.

20 Claims, 19 Drawing Sheets

Meeting Management Table 221a

| Case | Client Computing Device | State | User Proximity | Peripherals Used | Actions |
|---|---|---|---|---|---|
| Mobile to PC | PC | Unknown/ Inactive to Active_unlocked | Unknown to mid-field | Unknown to Onboard_devices | 1. Web service 220 sends meeting link to client service 211 on PC<br>2. Client service 211 on PC connects to meeting via UCS app 111 with audio and video muted<br>3. Web service 220 instructs client service 211 on mobile to mute audio and video<br>4. Web service 220 instructs client service 211 on PC to unmute audio and video<br>5 (optional). Web service 220 instructs client service 211 on mobile to disconnect |
| | Mobile | Active | Near-field | Onboard_devices | |
| PC to Mobile | PC | Active_unlocked to Active_locked | Mid-field to far-field | Onboard_devices | 1. Web service 220 sends meeting link to client service 211 on mobile<br>2. Client service 211 on mobile connects to meeting via UCS app 111 with audio and video muted<br>3. Web service 220 instructs client service 211 on PC to mute audio and video<br>4. Web service 220 instructs client service 211 on mobile to unmute audio and video<br>5 (optional). Web service 220 instructs client service 211 on PC to disconnect |
| | Mobile | Active_locked to Active_unlocked | Near-field | Onboard_devices to BT_headset | |

*FIG. 4A*

| Peripheral Management Table 221b ||||
|---|---|---|---|
| Meeting Mode | Multiple Client Computing Devices? | Available Peripherals | Actions |
| Webinar-listener | Yes (PC and Mobile) | PC: webcam, onboard speaker, and mic<br>Mobile: front camera, rear camera, onboard speaker and mic | • Enable webcam only on PC<br>• Disable mic on PC and mobile<br>• Enable speakers on PC and mobile |
| | No | N/A | • No changes |
| Collab-session-host | Yes (PC and Tablet) | PC: webcam, BT headset<br>Tablet: front camera, rear camera, onboard speaker, mic, touchscreen enabled | • Disable webcam on PC and tablet<br>• Whiteboard on tablet<br>• Enable audio input and output on PC |
| | Yes (PC and Tablet) | PC: webcam, BT headset<br>Tablet: front camera, rear camera, onboard speaker, mic, touchscreen disabled | • No changes |
| | No | N/A | • No changes |
| | | ⋮ | |

*FIG. 4B*

Meeting Table 222

| Meeting ID | User IDs | Client computing device Info |
|---|---|---|
| 33281536 | Alice@email.com | DeviceId1; JID1; Peripherals{...}, ... |
| | Bob@email.com | DeviceId2; JID2; Peripherals{...}, ... |
| | John@email.com | DeviceId3; JID3; Peripherals{...}, ... |
| | Alice@email.com | DeviceId4; JID4; Peripherals{...}, ... |
| ... | | |

User/Meeting Table 223

| Meeting ID/User ID | Device Description | Device Id | JID | Available Peripherals |
|---|---|---|---|---|
| 33281536/ Alice@email.com | PC | DeviceId1 | JID1 | Video: onboard webcam<br>Audio: onboard speaker and mic |
| | Mobile | DeviceId4 | JID4 | Video: front camera, rear camera<br>Audio: onboard speaker and mic; BT headset (speaker and mic) |
| ... | | | | |

*FIG. 4C*

MANAGING A USER'S MEETING ACROSS MULTIPLE CLIENT COMPUTING DEVICES

CROSS-REFERENCE TO RELATED APPLICATIONS

N/A

BACKGROUND

Unified conferencing solutions (UCS) such as Zoom, Teams, WebEx, etc. enable users to participate in UCS meetings, or simply meetings, using their client computing devices. FIG. 1 provides an example of a typical UCS environment 100. As shown, a number of client computing devices 110-1 through 110-n (individually and collectively client computing device(s) 110) may participate in a meeting using a UCS app 111. Client computing devices 110 could be desktops, laptops, tablets, smart phones, etc. Each UCS app 111 can interface with a UCS server 120 that manages the delivery of audio, visual and/or other content during the meeting. Each UCS app 111 can interface with A/V peripheral drivers 112 to access A/V peripherals 113 that may be integrated into or connected to the respective client computing device 110. A/V peripherals 113 may oftentimes include a microphone, a webcam, a display (e.g., a monitor or built-in display), an audio output device (e.g., a speaker, headset or earbuds), etc.

A UCS typically allows a user to access a meeting from multiple client computing devices 110. For example, a user may join a meeting using his or her smart phone while travelling to the office. Then, upon reaching the office, the user may join the meeting using his or her desktop. To avoid missing part of the meeting, the user may typically remain joined to the meeting on the smart phone until successfully joining the meeting on the desktop computer. In such a scenario, the user will likely need to mute the audio on the smart phone while joining on the desktop to prevent feedback. The user may also turn off the video on the smart phone while joining on the desktop. This manual process for switching over to the desktop is tedious and error prone. Similar difficulties exist when switching between any computing devices 110 during a meeting.

A user may also desire to continue using one or more A/V peripherals 113 when switching between client computing devices 110 during a meeting. For example, a user may use earbuds while participating in a meeting via a smart phone and may desire to continue using the earbuds when switching over to a desktop in the office. In such a case, the user may need to disconnect the earbuds from the smart phone and connect them to the desktop as part of connecting to the meeting on the desktop.

BRIEF SUMMARY

The present invention extends to systems, methods and computer program products for managing a user's meeting across multiple client computing devices. A client service can be employed on client computing devices that a user may use to participate in meetings. The client services can interface with a web service to enable the web service to manage the user's meetings when the user may use multiple client computing devices during the meeting. This management can include switching the meeting from one client computing device to another based on context or managing the peripherals available at multiple client computing devices that the user may simultaneously use to participate in the meeting.

In some embodiments, the present invention may be implemented as a method for managing a user's meeting across multiple client computing devices. It can be detected that a user has joined a meeting of a UCS from multiple client computing devices. One or more actions to be performed to manage peripherals of the multiple client computing devices during the meeting can then be identified. The one or more actions can then be performed by interfacing with a component of the UCS.

In some embodiments, the present invention may be implemented as a method for managing a user's meeting across multiple client computing devices. While a user has joined a meeting of a UCS from a first client computing device, a context change at a second client computing device can be detected. In response to the context change, it can be determined that the user should be joined to the meeting via the second client computing device. The second client computing device can then be joined to the meeting.

In some embodiments, the present invention may be implemented as computer storage storing computer executable instructions which when executed implement a method for managing a user's meeting across multiple client computing devices. While a user is participating in a meeting via a first client computing device, a web service may receive a notification of a context change on a second client computing device. Based on the context change, the web service may identify that the user should be joined to the meeting via the second client computing device. The web service can then cause the second client computing device to join the meeting.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 4A-4C provide examples of data structures that could be used in embodiments of the present invention;

DETAILED DESCRIPTION

In this specification and the claims, the term "client computing device" should be construed as encompassing any computing device that an individual may use to participate in a meeting via a UCS application such as a desktop, laptop, tablet, smart phone, etc.

Figure 1:
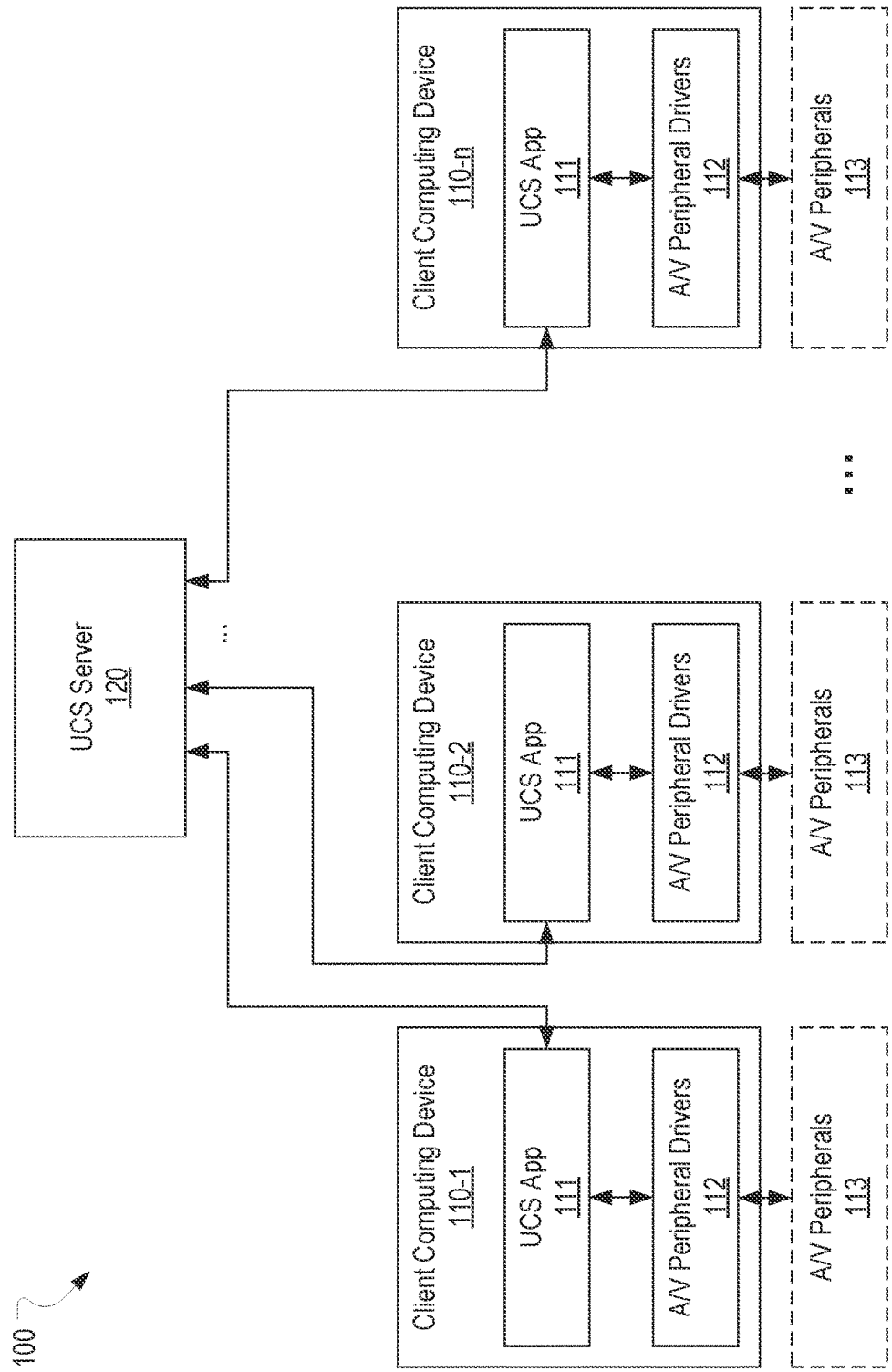
FIG. 1 provides an example of a UCS environment in which embodiments of the present invention could be implemented.
Figure 2:
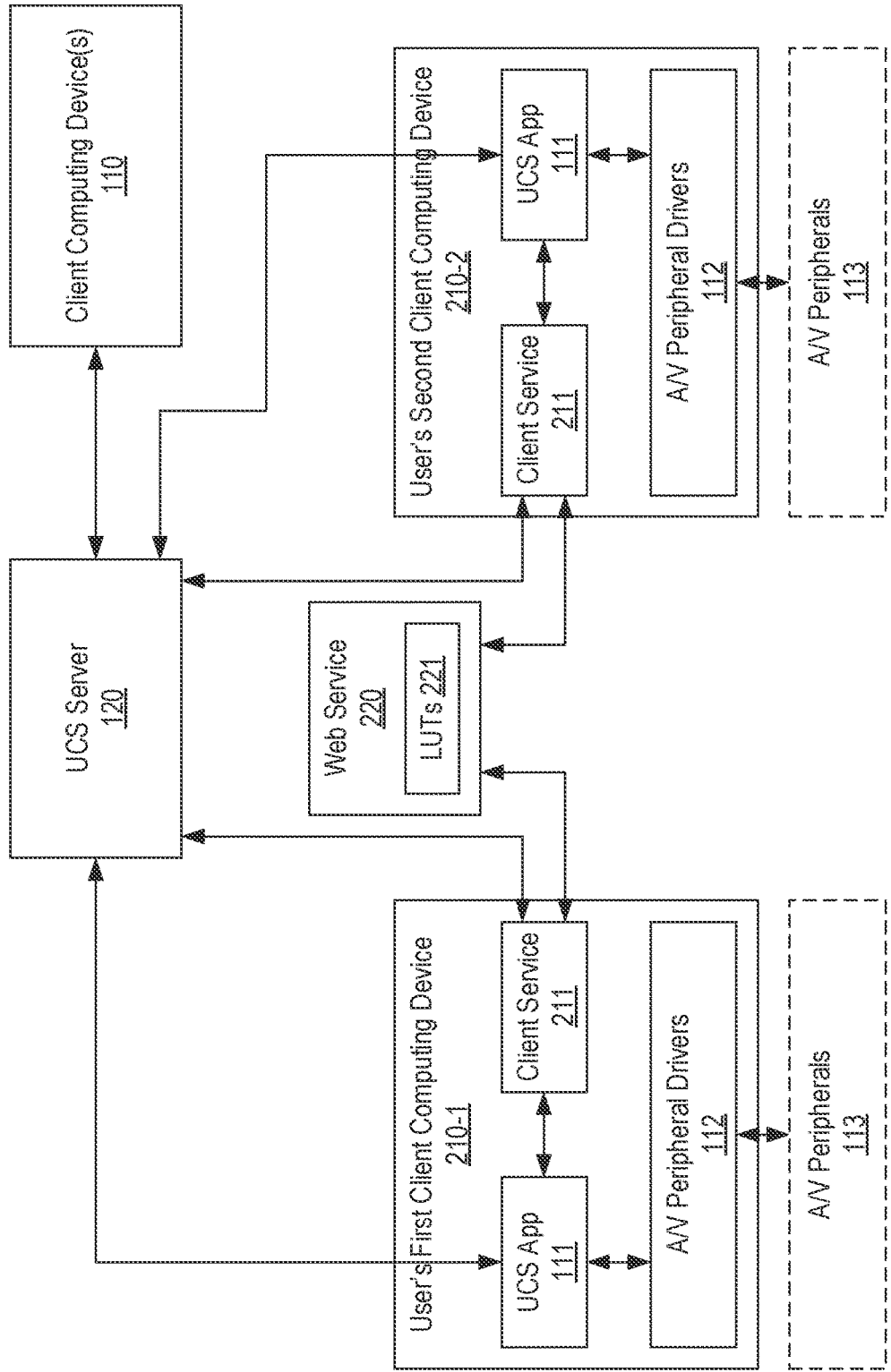
FIG. 2 provides an example of various components that can be used in the UCS environment of FIG. 1 to implement embodiments of the present invention.

FIG. 2 is based on FIG. 1 and illustrates various components that can be used in UCS environment 100 to manage a user's meeting across multiple client computing devices in accordance with one or more embodiments of the present invention. As in FIG. 1, FIG. 2 includes client computing device(s) 110 and UCS server 120. Client computing device(s) 110 may or may not be configured to implement embodiments of the present invention. In other words, not all users participating in a meeting need use client computing devices that are configured to implement embodiments of the present invention.

In FIG. 2, it is assumed that a user has a first client computing device 210-1 and a second client computing device 210-2 (collectively client computing devices 210). Notably, a user may use more than two client computing devices to participate in a meeting. Therefore, although the examples used herein will describe a user's use of two client computing devices, embodiments of the present invention should extend to scenarios where the user uses more than two client computing devices to participate in a meeting. Each of client computing devices 210 could be any type of client computing device. However, for purposes of this description, it will be assumed that client computing device 210-1 is the user's smart phone (or another mobile device) and client computing device 210-2 is the user's desktop (or other workstation).

Client computing devices 210, like client computing devices 110, can include UCS app 111 (or multiple UCS apps 111), A/V peripheral drivers 112 and A/V peripherals 113, which may be onboard peripherals or connected peripherals. Additionally, a client service 211 can be installed on client computing devices 210 to implement the functionality described herein. Also, a web service 220 may be provided to interface with client service 211. Web service 220 can maintain look-up tables (LUTs) 221 which, as described in detail below, define actions that may be taken based on context and/or available peripherals. In some embodiments, LUTs 221 may be defined/updated by an admin or possibly by the users.

As an overview, client service 211 on each of a user's client computing devices 210 that he or she may use to join and participate in a meeting can be configured to interface with web service 220 and UCS server 120 to enable the meeting to be managed across the multiple client computing devices 210. This management can include seamlessly switching the meeting between two client computing devices 210 based on context. This management may also or alternatively include seamlessly configuring peripherals of multiple client computing devices 210 that the user has used to join a meeting.

FIGS. 3A-3E provide an example of initial functionality that client service 211 and web service 220 can perform to enable a user's meeting to be managed across first client computing device 210-1 and second client computing device 210-2. Client service 211 may perform the depicted functionality on each client computing device 210.

Figure 3A:
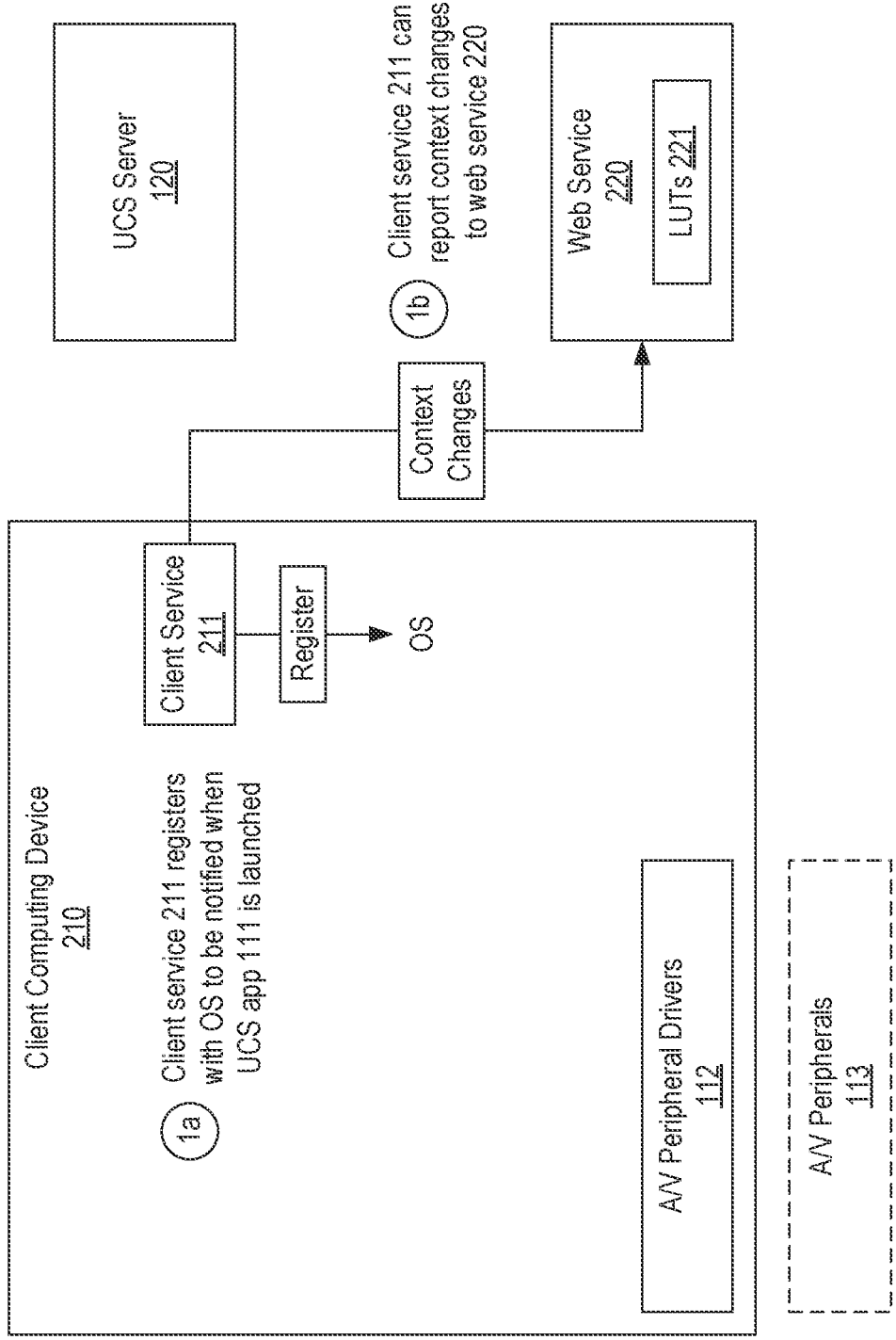
FIGS. 3A-3E provide an example of functionality that can be performed in embodiments of the present invention to enable a user's meeting to be managed across multiple client computing devices.

Turning to FIG. 3A, in step 1a, client service 211 can register with the operating system to be notified when UCS app 111 is launched. For example, in Windows-based implementations, client service 211 could use the ManagementEventWatcher class to subscribe to be notified when the process for Zoom, Teams, WebEx, etc. is loaded. In some embodiments, client service 211 could perform this registration as part of startup.

In step 1b, client service 211 can report context changes to web service 220. Client service 211 can do so whenever it is active on client computing device 210. For example, client service 211 can be configured to monitor the state of client computing device 210 (e.g., inactive, active-locked, active-unlocked, etc.), the user proximity to client computing device 210 (e.g., far-field, mid-field, or near-field), A/V peripherals 113 that are being used (e.g., onboard devices, BT headset, etc.), etc., and notify web service 220 when any of such context changes (e.g., when the user unlocks or locks client computing device 210, when the user moves from near-field to far-field, when the user connects or disconnects a peripheral, etc.). As described in detail below, client service 211 can report these context changes to enable web service 220 to determine when a user's meeting should be automatically switched from one client computing device 210 to another client computing device 210 and/or to determine how to manage peripherals during a meeting.

Figure 3B:
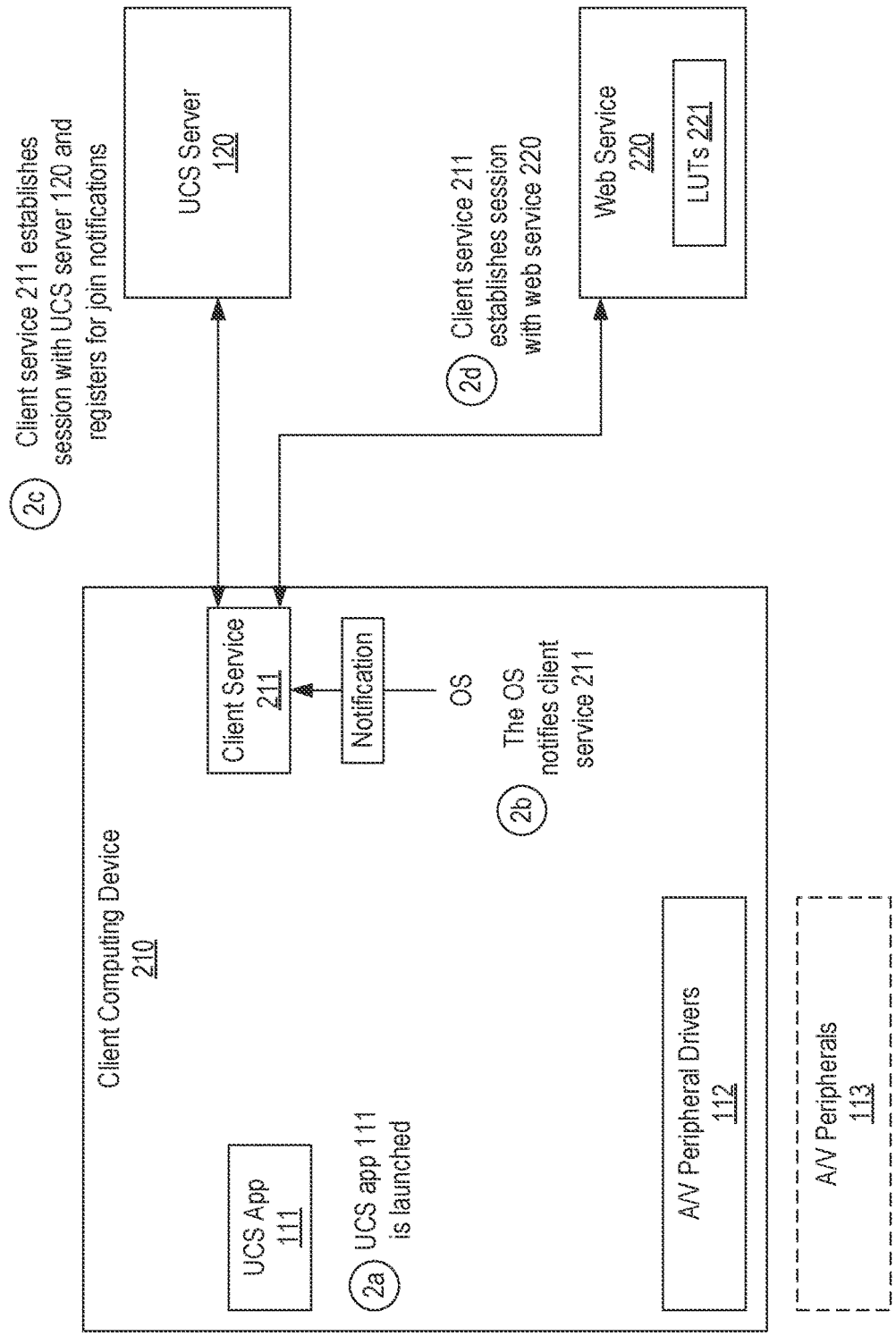

Turning to FIG. 3B, in step 2a, it is assumed that UCS app 111 is launched. For example, the user could click on a link to join a meeting which invokes UCS app 111 or could directly invoke UCS app 111. In step 2b, the operating system notifies client service 211 that UCS app 111 has launched. Using this notification, client service 211 can determine which UCS app 111 has been launched (e.g., whether it is Zoom, Teams, WebEx, etc.). In response to UCS app 111 being launched, in step 2c, client service 211 can establish a session with UCS server 120 and register to receive join notifications. For example, these join notifications could include meeting join notifications (e.g., notifications when a meeting is started, ended, etc.) and participant join notifications (notifications when participants join a meeting). In Zoom-based implementations, client service 211 could implement step 2c by registering for meeting.alert and meeting.participant_joined event notifications. In step 2d, client service 211 can also establish a session with web service 220.

Figure 3C:
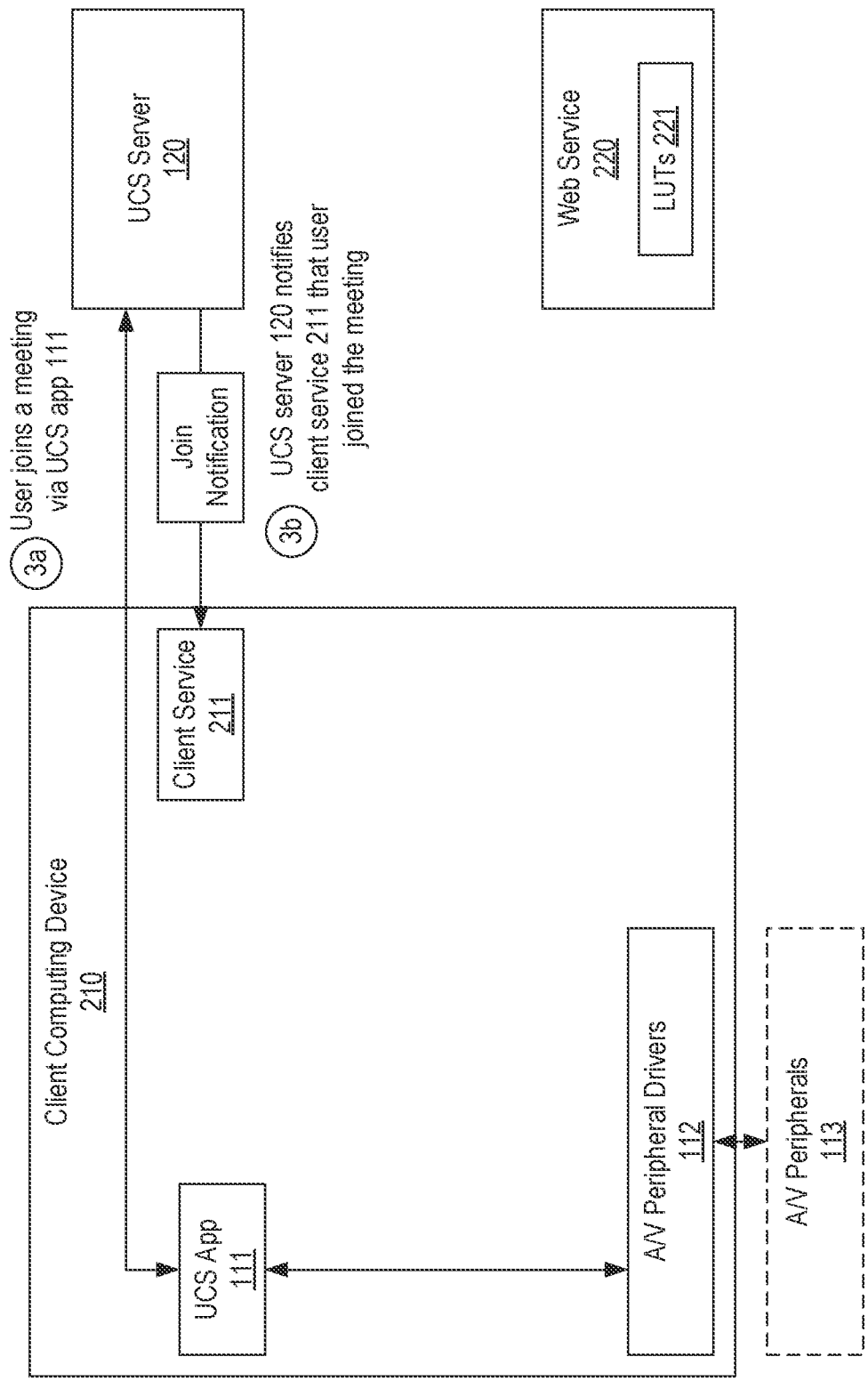

Turning to FIG. 3C, in step 3a, it is assumed that the user joins a meeting via UCS app 111. Then, in step 3b, UCS server 120 notifies client service 211 that the user has joined the meeting. This notification may include a variety of information about the user and the meeting such as the meeting ID and the user ID of the user that joined.

Figure 3D:
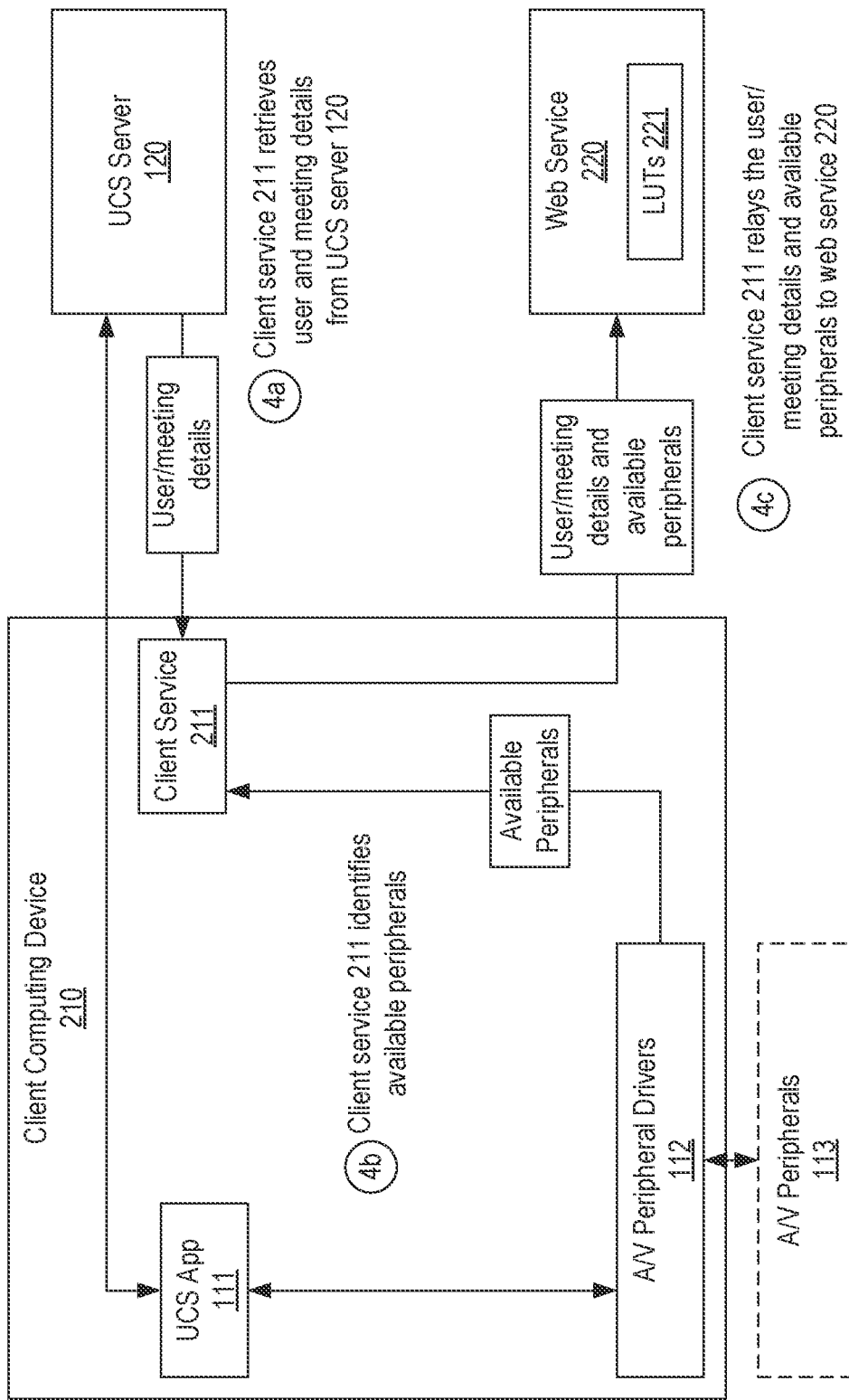

Turning to FIG. 3D, in step 4a and in response to being notified that the user joined the meeting, client service 211 can retrieve user and meeting details from UCS server 120. For example, client service 211 could retrieve the user's email address, a unique instance ID (e.g., a unique ID assigned by the UCS to client computing device 210), a chat-endpoint ID (e.g., the JID in Zoom), a unique meeting ID, etc. In step 4b, client service 211 can identify the peripherals that are available on client computing device 210. Then, in step 4c, client service 211 can relay the user/meeting details and the available peripherals to web service 220.

Figure 3E:
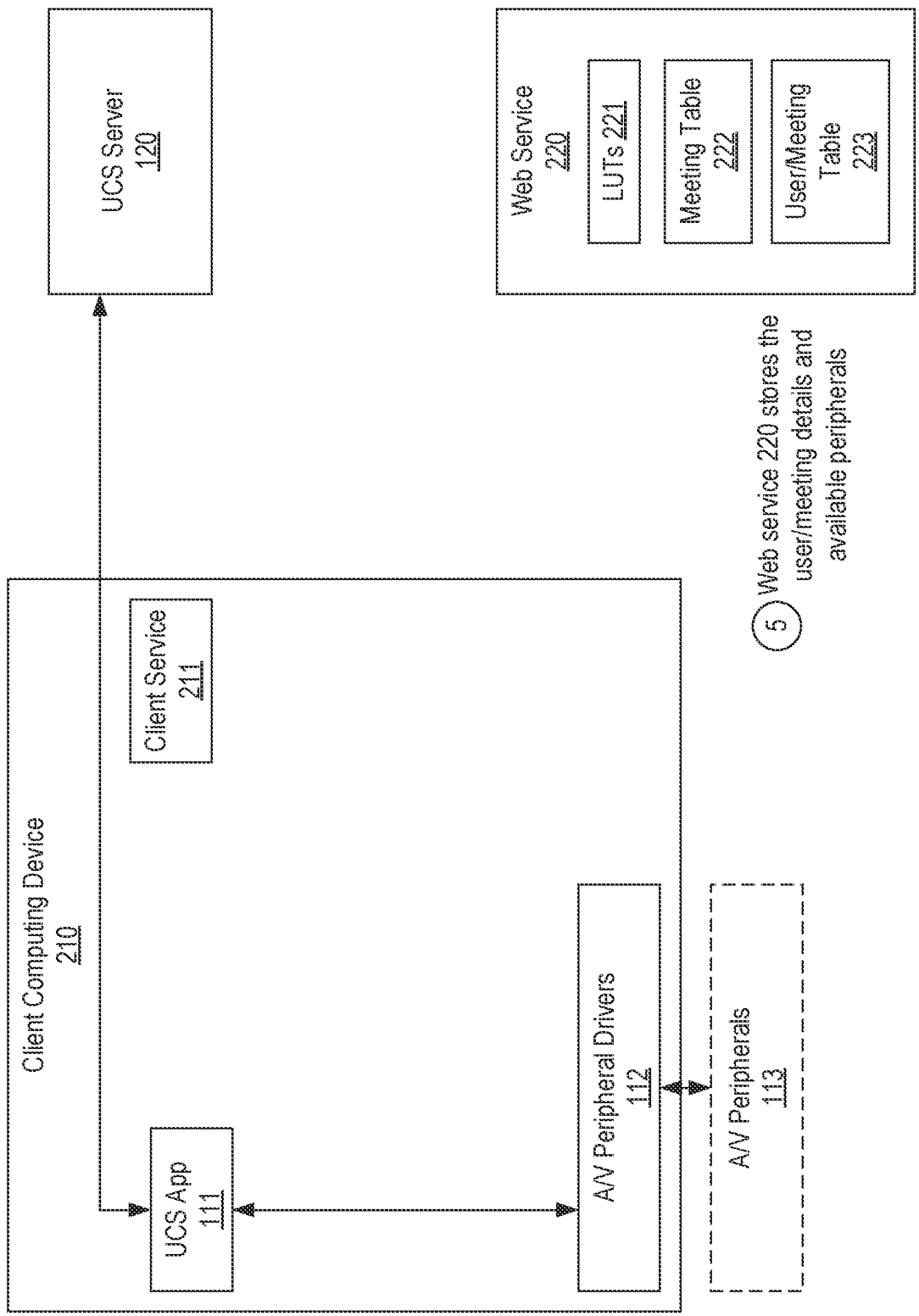

Turning to FIG. 3E, in step 5, web service 220 can store the user/meeting details and the available peripherals for client computing device 210. For example, in some embodiments, web service 220 could create/update a meeting table 222 that associates the meeting ID with the user ID and information about client computing device 210 such as its unique instance ID, JID and available peripherals and a user/meeting table 223 that associates the meeting ID/user ID combination with each client computing device 210 that user has used to join the meeting. In some embodiments, web service 220 may create user/meeting table 223 only upon detecting that the user has joined the meeting from multiple client computing devices 210. Alternatively, web service 220 could create user/meeting table 223 when the user joins from one client computing device 210 and then update user/meeting table 223 when the user joins from another client computing device 210.

Notably, in most scenarios, steps 3a-5 will be performed on first client computing device 210-1 and second client computing device 210-2 at different times. For example, the user may join the meeting on client computing device 210-1 and subsequently join the meeting on client computing device 210-2 or vice versa. Of primary importance is that client service 211 enables web service 220 to detect when a user has joined a meeting on more than one client computing device 210 and to identify each client computing device 210 and its available peripherals.

Prior to describing how web service 220 can manage the user's meeting across multiple client computing devices 210, examples of how LUTs 221, meeting table 222 and user/meeting table 223 could be configured in one or more embodiments of the present invention are provided. These examples are not intended to be comprehensive and represent only some of possibly many different scenarios that could be managed.

FIG. 4A shows that LUTs 221 could include a meeting management table 221a which defines actions that may be taken when the user transitions from using one client computing device 210 to another client computing device 210 while the user is participating in a meeting. Notably, whether the actions defined in meeting management table 221a are taken can depend on context. Stated another way, web service 222 can employ context at one or both of the two client computing devices 210, which as described above may be reported in step 1b, to determine when the user has transitioned from using one client computing device 210 to using the other client computing device 210.

In the depicted example, meeting management table 221a defines two cases: (1) when the user transitions from a mobile device to a PC; and (2) when the user transitions from a PC to a mobile device. As stated above, it is assumed that client computing device 210-1 is a smart phone and client computing device 210-2 is a PC. Accordingly, if the user is participating in a meeting on his or her smart phone (client computing device 210-1) and then transitions to using his or her PC (client computing device 210-2), the first set of actions defined in meeting management table 221a could be performed. In contrast, if the user is participating in a meeting on his or her PC and then transitions to using his or her smart phone, the second set of actions defined in meeting management table 221a could be performed.

FIG. 4B shows that LUTs 221 could include a peripheral management table 221b which defines actions that may be taken when the user is using multiple client computing devices 210 to participate in a meeting. In some embodiments, peripheral management table 221b could associate a meeting mode (e.g., webinar-listener, collab-session-host, etc.) with one or more sets of actions that may be taken based on available peripherals. For example, when the meeting mode is webinar-listener and the user is participating in the meeting via multiple client computing devices 210, the same set of actions may be taken regardless of the available peripherals. In contrast, when the meeting mode is collab-session-host and the user is participating on multiple client computing devices 210 including a tablet, the set of actions may depend on whether the tablet's touchscreen is enabled. Accordingly, the actions to be taken can depend on the anticipated role that the user may have in the meeting. The depicted meeting modes are only examples of a wide variety of possible meeting modes that could be implemented using the techniques of the present invention.

Both meeting management table 221a and peripheral management table 221b could be predefined by an admin and/or the user. For example, an admin could define the various actions to take in a particular scenario/context for each user in an organization. As another example, the user could be enabled to define the actions that should be taken in a particular scenario/context.

FIG. 4C provides an example of meeting table 222 and user/meeting table 223. Unlike meeting management table 221a and peripheral management table 221b which may typically be predefined and not meeting-specific, meeting table 222 and user/meeting table 223 are meeting-specific and are created/updated as the meetings are hosted and users join/leave the meetings.

Meeting table 222 can associate a meeting ID with the user ID of each user that has joined the meeting and the details of the client computing device that each user is using to participate in the meeting. Notably, meeting table 222 need not include an entry for all participants in the meeting. For example, if the meeting includes participants that are using client computing devices on which client service 211 is not running, web service 220 may not receive information for such participants or their client computing devices.

In the depicted example, meeting table 222 includes an entry for a meeting with a meeting ID of 33281536. This meeting ID is associated with four User ID entries two of which are the same (Alice@email.com). Accordingly, FIG. 4C represents a scenario where Alice has joined the meeting from two different client computing devices 210. It is assumed that Alice joined via first client computing device 210-1 which has a unique instance ID of DeviceId1 and a JID of JID1 and via second client computing device 210-2 which has a unique instance ID of DeviceId4 and a JID of JID4. Notably, web service 220 could have populated meeting table 222 with this information in response to step 4c being performed on first client computing device 210-1 and on second client computing device 210-2. By detecting that Alice@email.com is included twice in the entry for meeting ID 33281536, web service 220 can detect that Alice has joined the meeting with two different client computing devices 210.

User/meeting table 223 can associate the combination of a meeting ID and a user ID with information about each client computing device 210 that the respective user has used to join the respective meeting. In other words, there can be an instance of user/meeting table 223 (or entry in a single user/meeting table 223) for each user per meeting. In some embodiments however, web service 220 may only create a user/meeting table 223 when it detects that a user has joined a meeting from two different client computing devices 220. In the depicted example, user/meeting table 223 indicates that Alice has joined meeting 33281536 using a PC with a unique instance ID of DeviceId1, a JID of JID1 and available peripherals that include an onboard webcam and an onboard speaker and mic and also indicates that Alice has joined this same meeting using a mobile device having a unique instance ID of DeviceId4, a JID of JID4 and available peripherals that include a front camera, a rear camera, an onboard speaker and mic and a Bluetooth headset that includes a speaker and a mic.

FIGS. 5A-5D provide an example of how web service 220 can seamlessly manage peripherals of two client computing devices 210 when a user has joined a meeting using both client computing devices 210. For purposes of this example, it can be assumed that steps 1a-5 were first performed when the user, Alice, joined meeting 33281536 using her smart phone (first client computing device 210-1), and then steps 1a-5 were subsequently performed when Alice joined the same meeting using her PC (second client computing device 210-2). It can also be assumed that web service 220 has created and updated meeting table 222 and user/meeting table 223 to match what is shown in FIG. 4C and that peripheral management table 221b as depicted in FIG. 4B is applicable to Alice.

Figure 5A:
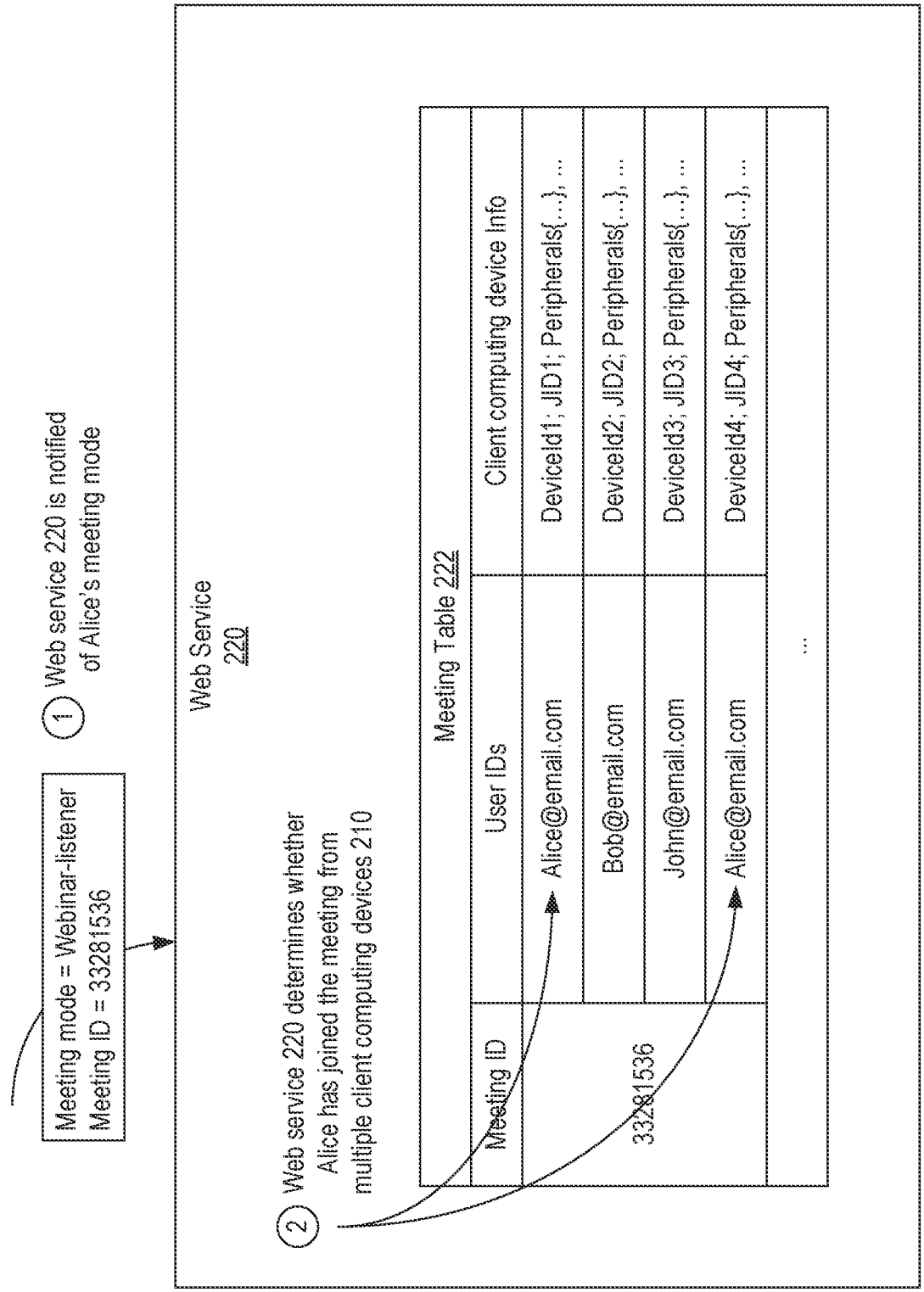
FIGS. 5A-5D provide an example of how peripherals can be managed when a user joins a meeting from multiple client computing devices.

Turning to FIG. 5A, in step 1, it is assumed that web service 220 is notified that the meeting mode for Alice is webinar-listener. For example, Alice could provide input to either first client computing device 210-1 or second client computing device 210-2 that she would like the meeting mode to be webinar-listener. Alternatively, client service 211 on either first client computing device 210-1 or second client computing device 210-2 could detect that the meeting mode should be webinar-listener. In step 2, web service 220 can determine whether Alice has joined the meeting from multiple client computing devices 210. In this example, web service 220 will determine from meeting table 222 that Alice has joined from multiple client computing devices 220. With reference to FIG. 4B, if Alice has only joined from a single client computing device 210 (which would have been the case when she had only joined via first client computing device 210-1), there may be no actions to take to implement the meeting mode. However, in some embodiments, peripheral management table 221b could define actions to take when a user has joined from a single client computing device 210. Therefore, step 2 can be performed to make this possible.

Figure 5B:
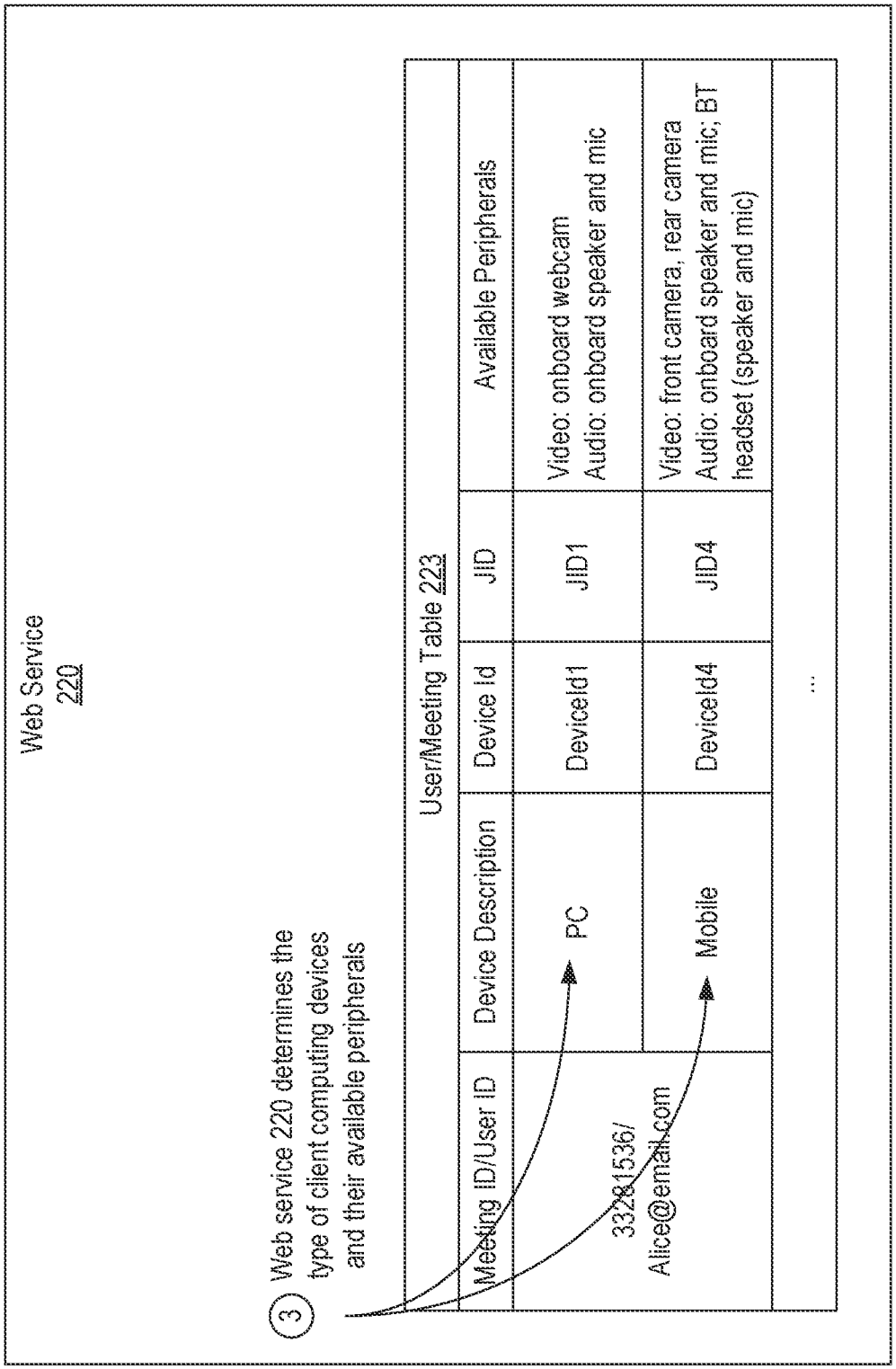

Turning to FIG. 5B, in step 3, web service 220 can determine the type of client computing devices 210 that Alice is using the join the meeting and may also identify their peripherals. For example, web service 220 can access user/meeting table 223 to obtain the entry for the respective meeting ID and user ID for Alice and determine from this entry that Alice has joined via a PC and a mobile device.

Figure 5C:
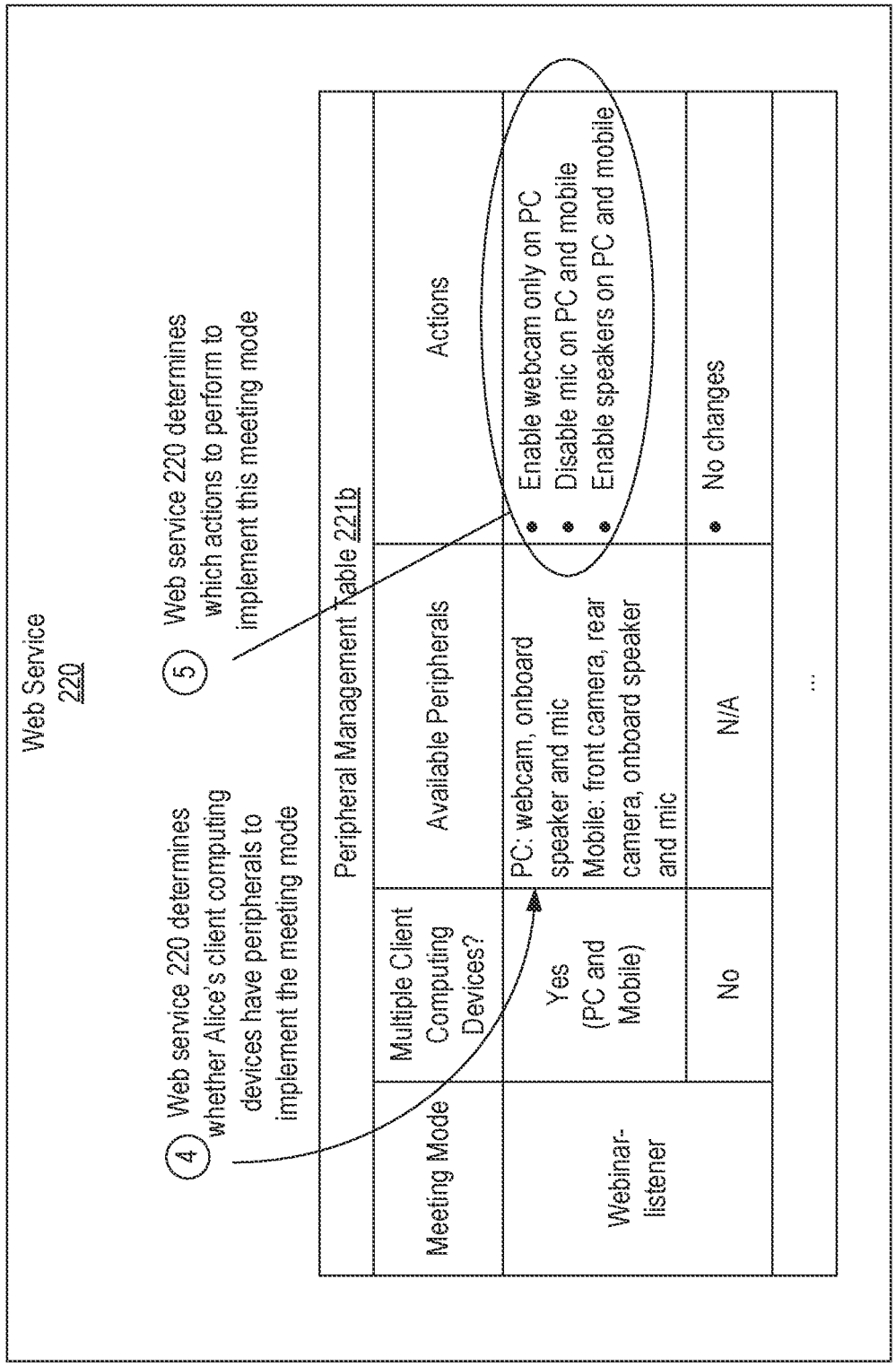

Turning to FIG. 5C, in step 4, web service 220 can determine whether Alice's client computing devices 210 have peripherals to implement the specified meeting mode. For example, web service 220 can determine whether user/meeting table 223 identifies peripherals that peripheral management table 221b identifies for the webinar-listener meeting mode. In this example, Alice's PC and smart phone have peripherals necessary to implement the webinar-listener meeting mode. Accordingly, in step 5, web service 220 can determine which actions should be performed on each client computing device 210 to implement the meeting mode. In this example, these actions include enabling the webcam only on the PC, disabling the mic on the PC and the smart phone and enabling the speakers on both the PC and the smart phone. This is only one example of the many different types of actions that could be taken for any given meeting mode.

Figure 5D:
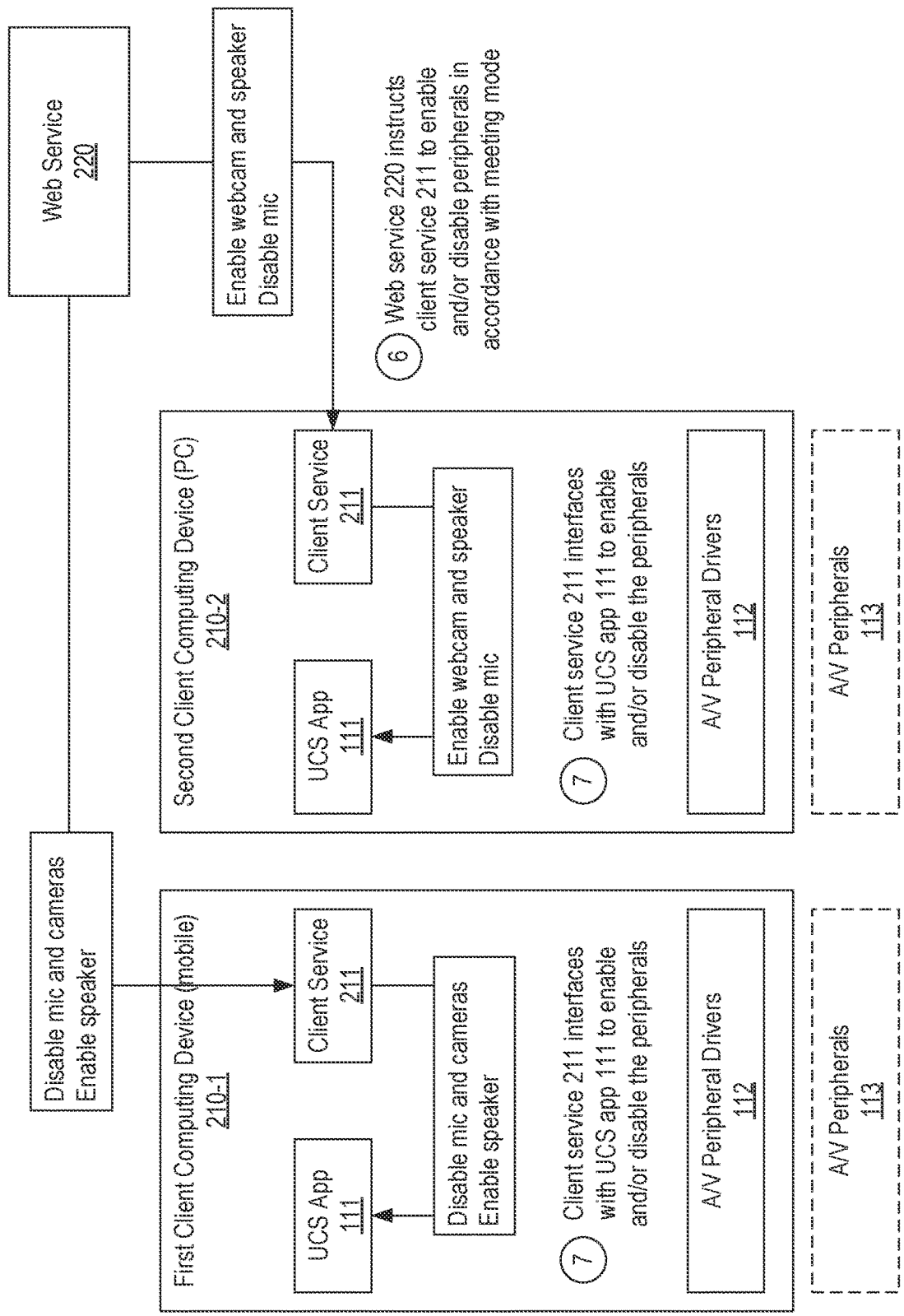

Turning to FIG. 5D, in step 6, web service 220 can instruct client service 211 on each client computing device 210 to enable and/or disable peripherals in accordance with the specified meeting mode. For example, web service 220 can instruct client service 211 on first client computing device 210-1 to disable the mic and cameras and enable the speaker in UCS app 111 and can instruct client service 211 on second client computing device 210-2 to enable the webcam and speaker and disable the mic. In step 7, client service 211 on each client computing device 210 can interface with UCS app 111 (e.g., via the UCS app's SDK) or possibly interface with a web SDK or any other available mechanism to enable and/or disable the peripherals accordingly. This process could be repeated anytime the meeting mode is updated.

FIGS. 6A-6E provide an example of how web service 220 can determine when to switch a user's meeting between client computing devices 210 based on context. This example is based on a scenario where the context change is the user's proximity to a client computing device 210. However, the depicted functionality could be performed when other types of context changes are detected.

Figure 6A:
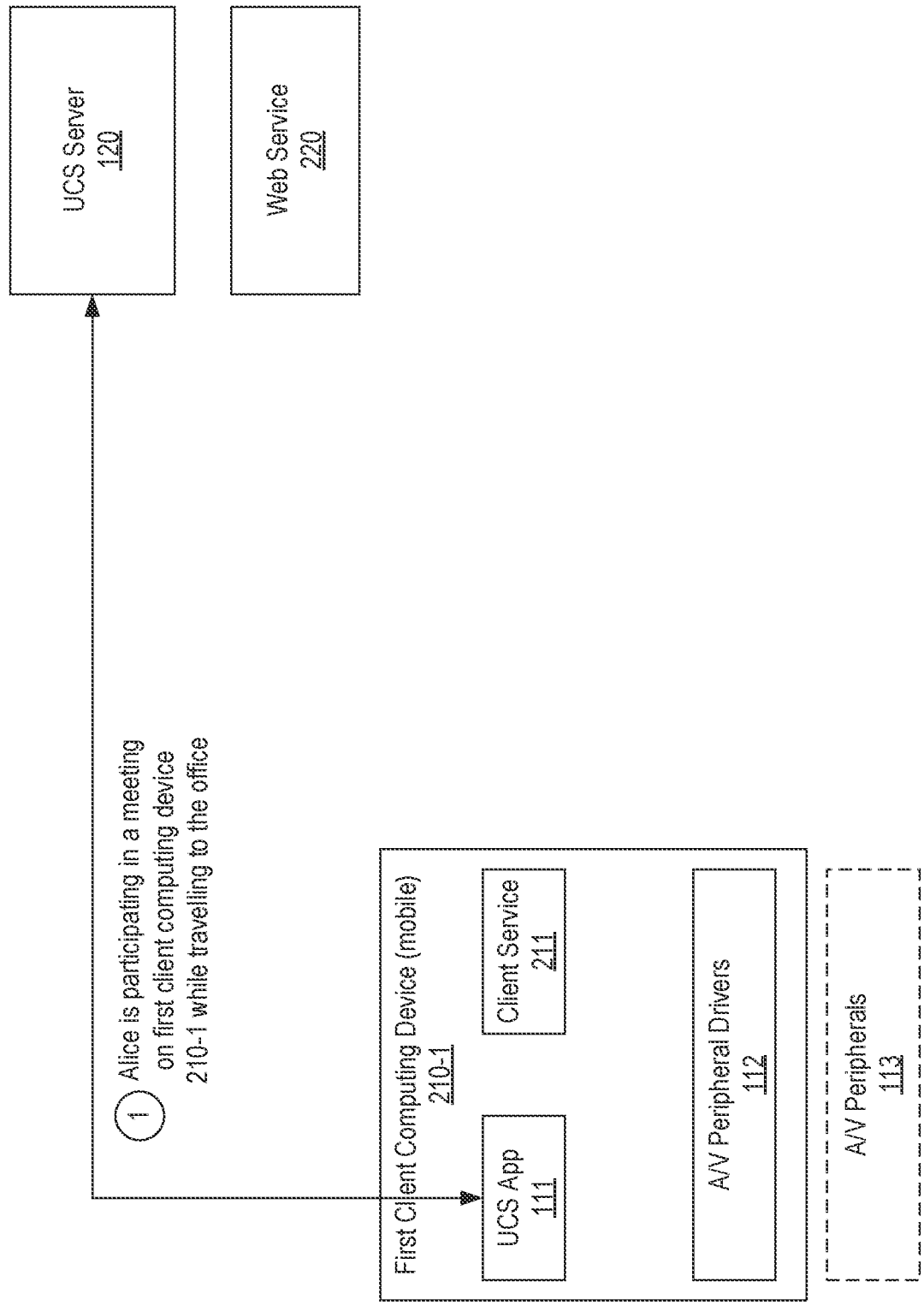
FIGS. 6A-6E provide an example of how a meeting can be switched between client computing devices based on context.

Turning to FIG. 6A, in step 1, it is assumed that Alice is participating in a meeting on first client computing device 210-1 while travelling to the office. For example, Alice may be participating in the meeting using her smart phone.

Figure 6B:
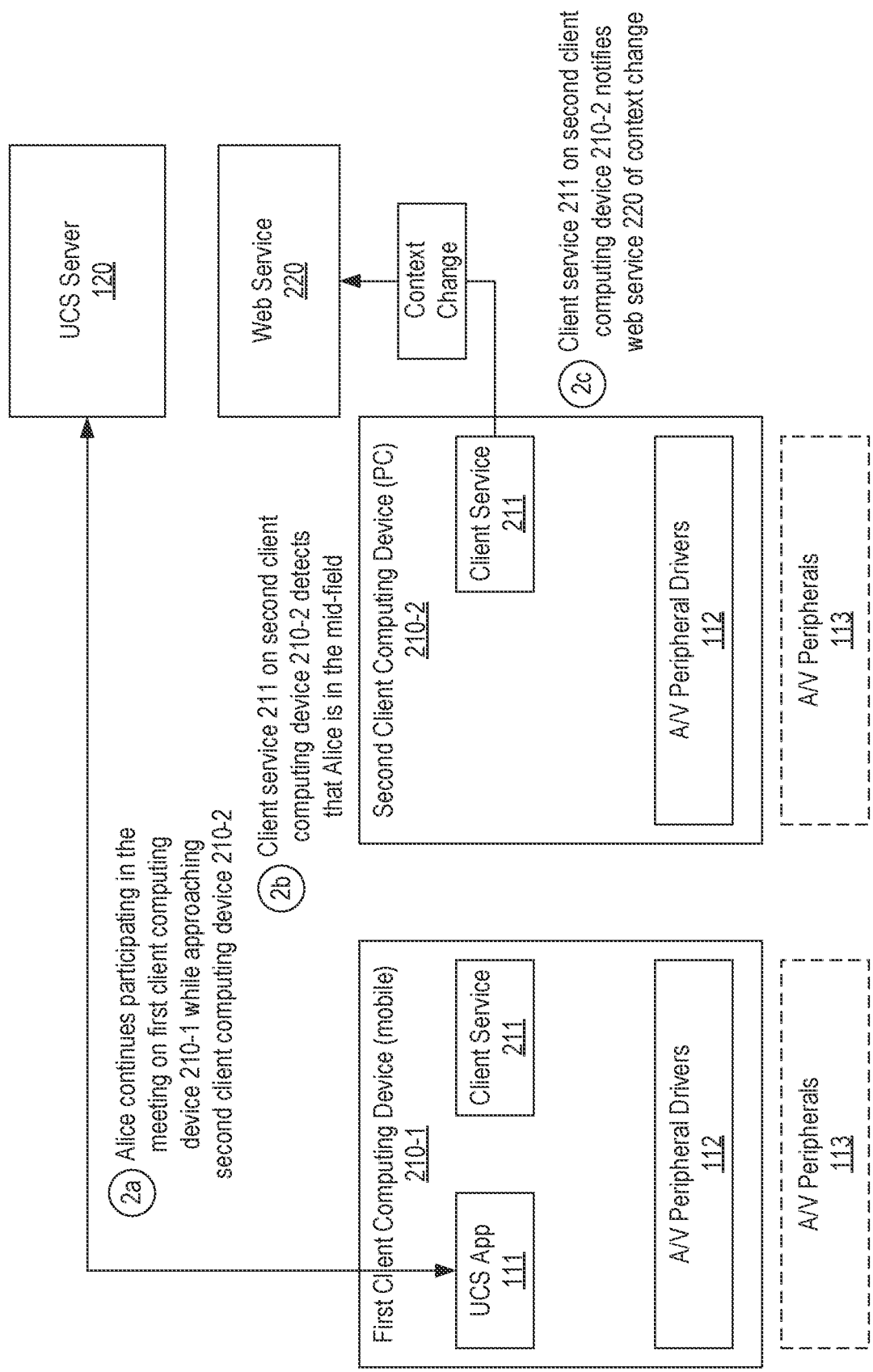

Turning to FIG. 6B, in step 2a, it is assumed that Alice arrives at the office and continues participating in the meeting on first client computing device 210-1 while approaching second client computing device 210-2, which is assumed to be her PC or other workstation in the office. In step 2b, client service 211 on second client computing device 210-2 can detect that Alice is in the mid-field relative to second client computing device 210-2 (e.g., by using a proximity sensor on second client computing device 210-2). Then, in step 2c, client service 211 on second client computing device 210-2 can notify web service 220 of this context change such as by reporting that Alice is in the mid-field. Notably, client service 211 on first client computing device 210-1 and client service 211 on second client computing device 210-2 may each repeatedly monitor for and report context changes such as the state of the respective client computing device 210, the user's proximity to the respective client computing device 210, the peripherals that the user is using on the respective client computing device 210, etc. Accordingly, client service 211 could perform step 2c in response to detecting any type of context change.

Figure 6C:
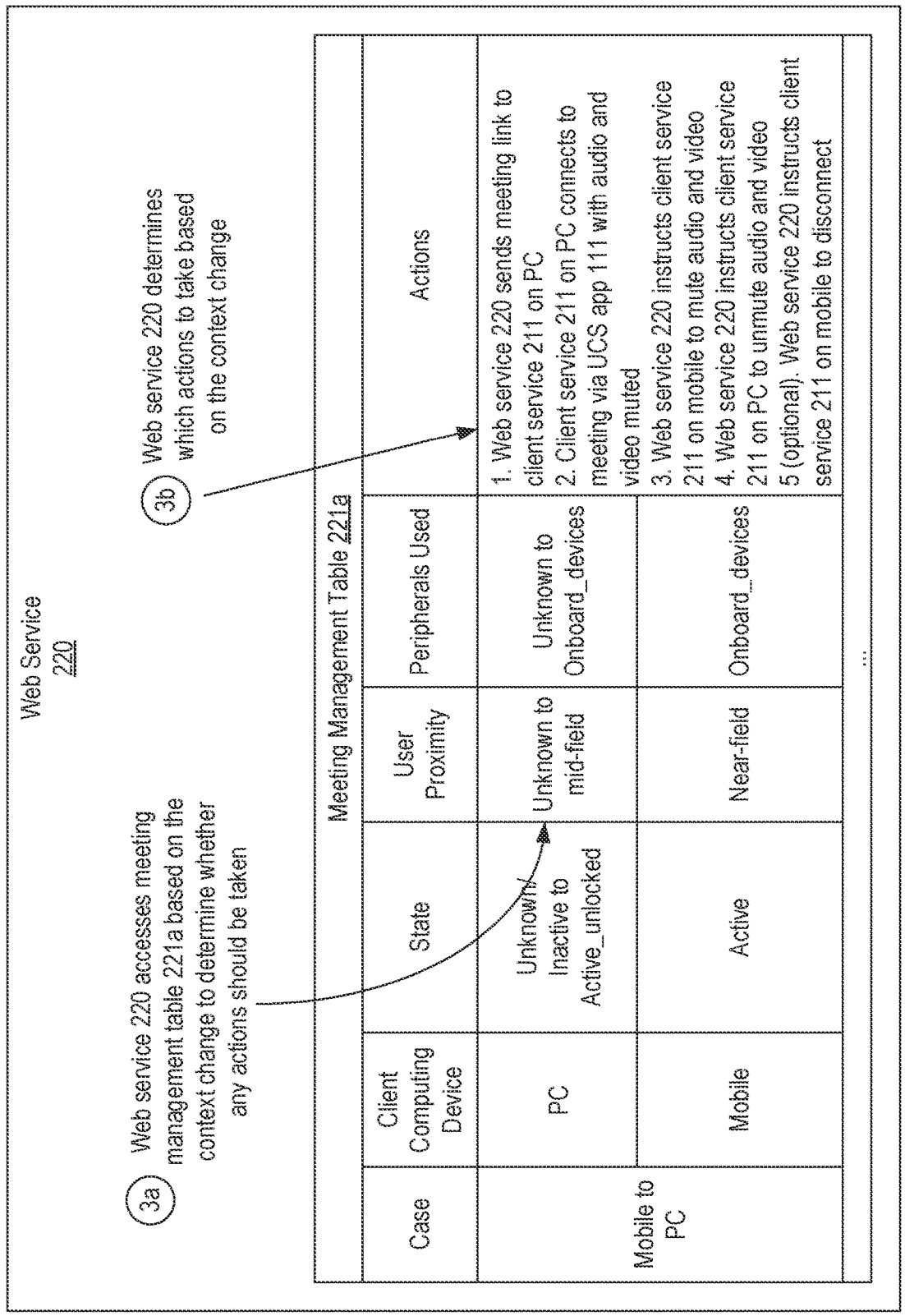

Turning to FIG. 6C, in step 3a and in response to receiving the notification of the context change, web service 220 can access meeting management table 221a to determine whether any actions should be taken. For example, web service 220 can determine that the context change represents a change in the user's proximity relative to client computing device 210-2 from unknown to mid-field. In some embodiments, in conjunction with determining that a context change has occurred on/relative to one client computing device 210, web service 220 may also verify the current context of another client computing device 210. For example, in addition to determining that the user proximity relative to second client computing device 210-2 (a PC) has changed from unknown to mid-field, web service 220 can also determine that the current context reported by client service 211 on first client computing device 210-1 defines an active state, the user's presence in the near-field and current use of the onboard devices. In other words, a set of actions in meeting management table 221a can be associated with context changes that may trigger the actions and possibly current context that may also be required. Returning to the example, in step 3b, web service 220 can determine from meeting management table 221a that the change in Alice's proximity to the PC while she is participating in a meeting on her smart phone should trigger a switch of the meeting to her PC and can obtain the defined actions to carry out the switch.

Figure 6D:
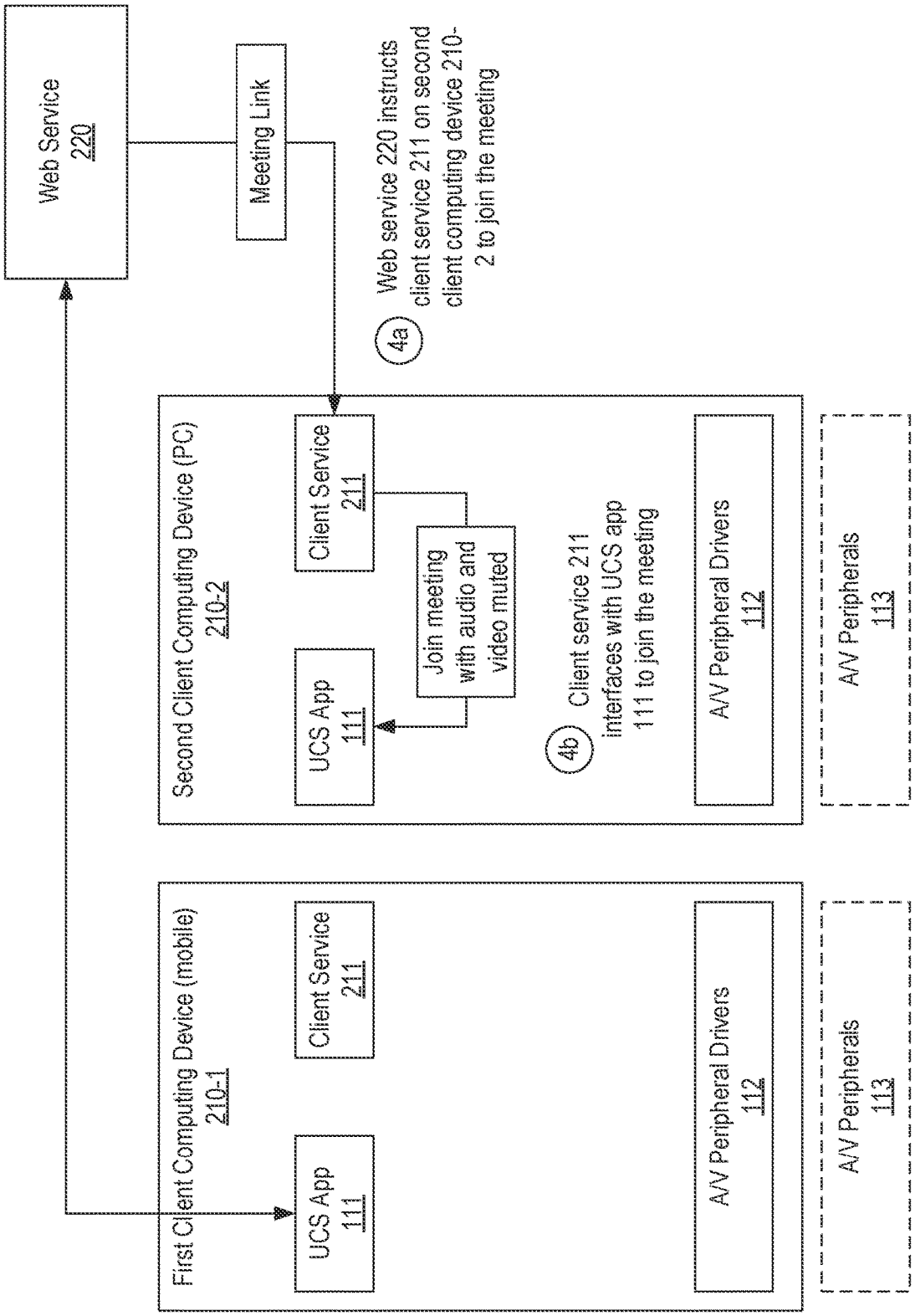

Turning to FIG. 6D, in step 4a, web service 220 can instruct client service 211 on second client computing device 210-2 to join the meeting that Alice is participating in on first client computing device 210-1. For example, web service 220 could send the meeting link to client service 211 on second client computing device 210-2. In some embodiments, web service 220 could specify that client service 211 should join the meeting with the audio and video muted, while in other embodiments, client service 211 could be configured to join meetings with the audio and video muted as a default. In any case, in step 4b, client service 211 on second client computing device 210-2 can interface with UCS app 111 to join the meeting with the audio and video muted. Notably, at this point, Alice is still joined to the meeting and may have the audio and video unmuted on first client computing device 210-1.

Figure 6E:
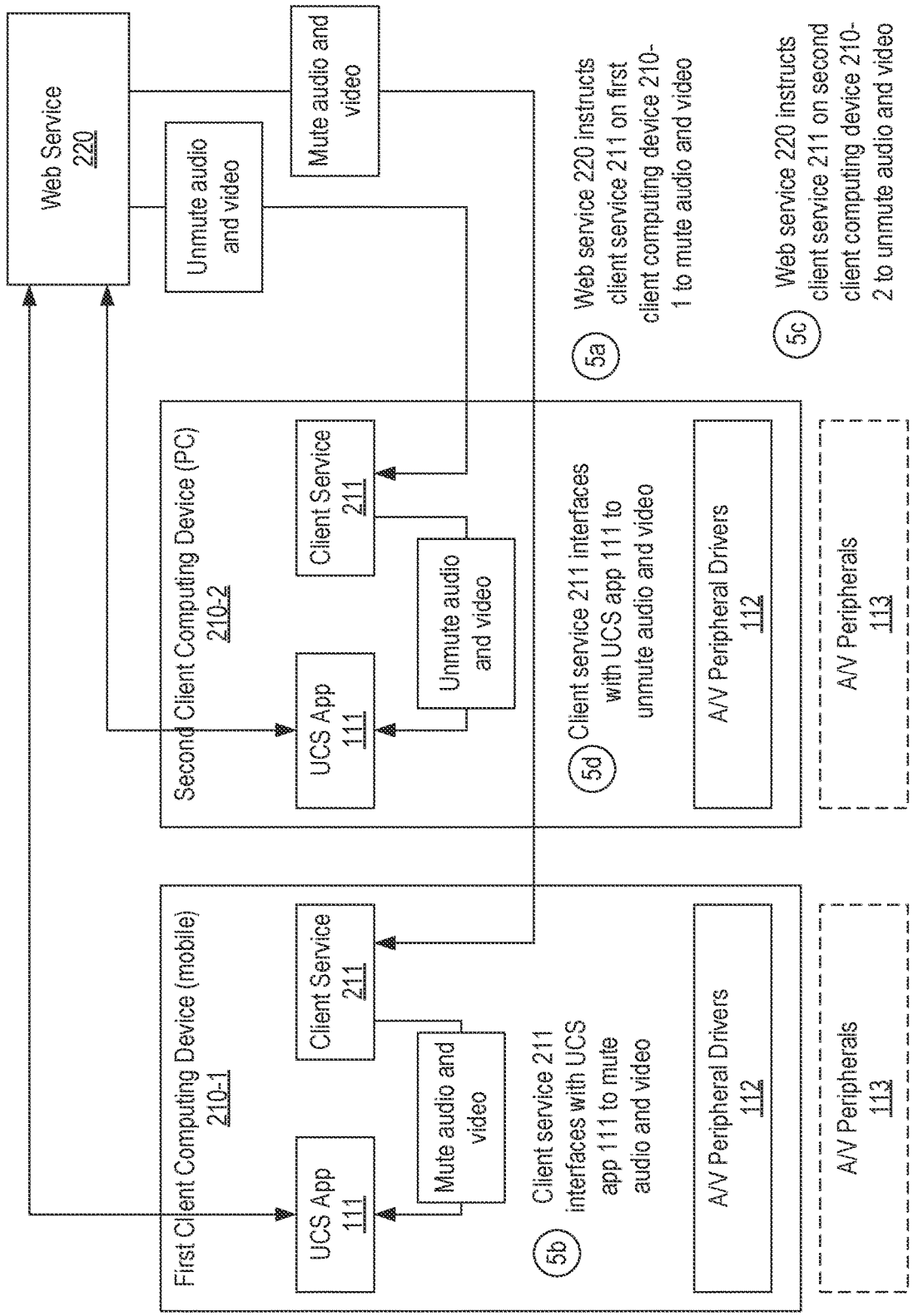

Turning to FIG. 6E, in step 5a, which web service 220 could perform in response to being notified that second client computing device 210-2 has successfully joined the meeting, web service 220 can instruct client service 211 on first client computing device 210-1 to mute the audio and video. In response, client service 211 on first client computing device 210-1 can interface with UCS app 111 to mute the audio and video (if not already muted) while remaining joined to the meeting. In step 5c, web service 220 can instruct client service 211 on second client computing device 210-2 to unmute the audio and video. In response, in step 5d, client service 211 on second client computing device 210-2 can interface with UCS app 111 to unmute the audio and video. Accordingly, after steps 5a-5d, Alice will be joined to the meeting on both her smart phone and her PC but only the audio and video on her PC will be unmuted. In some embodiments, web service 220 may perform step 5c only after receiving confirmation that step 5b has been successfully completed to ensure that audio is not unmuted on both client computing devices 210. Although not shown, in some embodiments, web service 220 may instruct client service 211 on first client computing device 210-1 to leave the meeting once second client computing device 210-2 has successfully joined the meeting and unmuted the audio and video. In this way, web service 220 and client services 211 can seamlessly transition the meeting from first client computing device 210-1 to second client computing device 210-2.

The process represented in FIGS. 6A-6E can be performed to transition a meeting between two client computing devices 210 based on any appropriate type of context change. For example, if during the same meeting, web service 220 detected that Alice moved away from second client computing device 210-2 and/or locked second client computing device 210-2 while unlocking first client computing device 210-1 or connecting a Bluetooth headset to first client computing device 210-1, web service 220 could perform a similar process to switch the meeting back to first client computing device 210-1. Also, if web service 220 causes both client computing devices 210 to remain joined to the meeting, the process represented in FIGS. 5A-5D could be performed to determine how to manage the peripherals.

In some embodiments, web service 220 could employ machine learning techniques rather than LUTs 221 to determine how to manage peripherals when a user is participating in a meeting from multiple client computing devices 210. For example, web service 220 could employ machine learning techniques to select peripherals based on performance and/or status information of client computing device 210 or the meeting, which may be reported as context by client service 211, such as battery runtime, thermals, wireless signal strength, network performance, call billing, meeting quality metrics, etc. As one example, web service 220 could detect that a user's laptop battery is low and could switch the meeting over to the user's phone. As another example, web service 220 could determine that the meeting quality is low on the user's phone and could switch the meeting over to the user's workstation.

In some embodiments, web service 220 could select a client service 211 on one client computing device 210 to function as a master and could then route the above-described communications via this master client service. The master client service could then interface with a UCS-provided channel to manage the meeting across each client computing device 210 by which the user has joined or may join the meeting.

In summary, embodiments of the present invention enable a user's meeting to be seamlessly managed when the user uses multiple client computing devices while participating in a meeting. This management can be performed independently of the UCS and can be provided for a variety of UCSs.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for managing a user's meeting across multiple client computing devices, the method comprising:
    registering, by a client service on first client computing device, with an operating system to be notified when a unified conferencing solution (UCS) application of a UCS is launched on the first client computing device;
    receiving, by the client service, a notification from the operating system that the UCS application has been launched;
    in response to receiving the notification, registering, by the client service, with a UCS server of the UCS to receive join notifications,
    in conjunction with a user of the first client computing device joining a meeting of the UCS, receiving, by the client service, a notification from the UCS server that the user has joined the meeting;
    retrieving, by the client service, user and meeting details from the UCS server;
    providing, by the client service, the user and meeting details to a web service;
    detecting, by the web service, that the user has joined the meeting from a second client computing device while the user has joined the meeting from the first client computing device;
    identifying, by the web service, one or more actions to be performed to manage peripherals of the first client computing devices while the user has joined the meeting from the first client computing device and from the second client computing device;
    notifying, by the web service, the client service of the one or more actions; and
    interfacing, by the client service, with the UCS application to perform the one or more actions.

2. The method of claim 1, further comprising:
    receiving, from the client service on the first client computing device or a client service on the second client computing device, a notification of a meeting mode for the meeting;
    wherein detecting that the user has joined the meeting from the second client computing device while the user has joined the meeting from the first client computing device is performed in response to receiving the notification of the meeting mode.

3. The method of claim 2, wherein the one or more actions are associated with the meeting mode.

4. The method of claim 1, wherein the one or more actions comprise enabling an audio or video peripheral on the first client computing device:
    wherein the method further comprises:
        identifying, by the web service, one or more additional actions to be performed to manage peripherals of the second client computing device while the user has joined the meeting from the first client computing device and from the second client computing device;
        notifying, by the web service, a client service on the second client computing device of the one or more additional actions; and
        interfacing, by the client service on the second client computing device, with a UCS application on the second client computing device to perform the one or more additional actions, wherein the one or more additional actions include disabling an audio or video peripheral on the second client computing device.

5. The method of claim 1, further comprising:
    registering, by a client service on the second client computing device, with an opening system on the second client computing device to be notified when a UCS application is launched on the second client computing device;
    receiving, by the client service on the second client computing device, a notification from the operating system on the second client computing device that the UCS application has been launched on the second client computing device;
    in response to receiving the notification, registering, by the client service on the second client computing device, with the UCS server to receive join notifications;
    in conjunction with the user joining the meeting from the second client computing device, receiving, by the client service on the second client computing device, a notification from the UCS server that the user has joined the meeting;
    retrieving, by the client service on the second client computing device, user and meeting details to the web service;
    providing, by the client service on the second client computing device, the user and meeting details to the web service;
    wherein the web service detects that the user has joined the meeting from the second client computing device while the user has joined the meeting from the first client computing device in response to receiving the user and meeting details from the client service on the second client computing device.

6. The method of claim 1, wherein the user and meeting details include one or more of:
    the user's email address,
    a unique instance ID assigned to the first client computing device by the UCS;
    a chat-endpoint ID; or
    a unique meeting ID for the meeting.

7. The method of claim 1, further comprising:
    while the user has joined the meeting from the first client computing device but prior to the user joining the meeting from the second client computing device, detecting, by a client service on the second client computing device, a context change at the second client computing device; and
    based on the context change, causing, by the client service, the second client computing device to join the meeting.

8. The method of claim 7, wherein the context change includes one or more of:
    a state of the second client computing device;
    a proximity of the user to the second client computing device; or
    a use of the peripherals of the second client computing device.

9. A method for managing a user's meeting across multiple client computing devices, the method comprising:
    registering, by a client service on a first client computing device, with a operating system to be notified when a unified conferencing a solution (UCS) application of a UCS is launched on the first client computing device;

receiving, by the client service, a notification from the operating system that the UCS application has been launched;

in response to receiving the notification, registering, by the client service, with a UCS server of the UCS to receive join notifications;

in conjunction with a user of the first client computing device joining a meeting of the UCS, receiving, by the client service, a notification from the UCS server that the user has joined the meeting;

retrieving, by the client service, user and meeting details from the UCS server;

providing, by the client service, the user and meeting details to a web service;

while the user has joined the meeting from the first client computing device, receiving, by the web service and from a client service on a second client computing device, a notification of a context change at the second client computing device;

in response to the context change, determining, by the web service, that the user should be joined to the meeting via the second client computing device;

notifying, by the web service, the client service on the second client computing device that the user should be joined to the meeting; and causing, by the client service on the second client computing device, the second client computing device to join the meeting.

10. The method of claim 9, wherein the context change includes one or more of:
a state of the second client computing device;
a proximity of the user to the second client computing device; or
a use of peripherals of the second client computing device.

11. The method of claim 9, wherein it is determined that the user should be joined to the meeting via the second client computing device based also on context of the first client computing.

12. The method of claim 9, further comprising:
causing the second client computing device to join the meeting with audio or video muted.

13. The method of claim 12, further comprising:
causing the audio or video to be muted on the first client computing device; and
causing the audio or video to be unmuted on the second client computing device.

14. The method of claim 9, further comprising:
causing the first client computing device to leave the meeting after the second client computing device is joined to the meeting.

15. The method of claim 9, further comprising:
in response to the user being joined to the meeting via the first client computing device and the second client computing device, identifying, by the web service, one or more actions to be performed to manage peripherals of the first and second client computing devices during the meeting;
notifying, by the web service, the client service on the first client computing device and the client service on the second client computing device of the one or more actions; and interfacing, by the client service and the first client computing device and the client service on the second client computing device, with UCS application on the first client computing device and the second client computing device respectively to perform the one or more actions.

16. One or more computer storage media storing computer executable instructions which when executed implement a method for managing a user's meeting across multiple client computing devices, the method comprising:
registering, by a client service on a first client computing device, with an operating system to be notified when a unified conferencing solution (UCS) application of a UCS is launched on the first client computing device;
receiving, by the client service, a notification from the operating system that the UCS application has been launched;
in response to receiving the notification, registering, by the client service, with a UCS server of the UCS to receive join notifications;
in conjunction with a user of the first client computing device joining a meeting of the UCs, receiving, by the client service, a notification from the UCS server that the user has joined the meeting;
retrieving, by the client service, user and meeting details from the UCS server;
providing, by the client service, the user and meeting details to a web service;
while the user has joined the meeting from the first client computing device, receiving, by the web service and from a client service on a second client computing device, a notification of a context change at the second client computing device;
in response to the context change, determining, by the web service, that the user should be joined to the meeting via the second client computing device;
notifying, by the web service, the client service on the second client computing device that the user should be joined to the meeting; and
causing, by the client service on the second client computing device, the second client computing device to join the meeting.

17. The computer storage media of claim 16, wherein the method further comprises:
muting audio or video when joining the meeting on the second client computing device;
muting audio or video on the first client computing device; and
unmuting the audio or video on the second client computing device.

18. The computer storage media of claim 17, wherein the method further comprises:
causing the first client computing device to leave the meeting.

19. The computer storage media of claim 16, wherein the method further comprises:
managing peripherals of the first client computing device and peripherals of the second client computing device during the meeting.

20. The computer storage media of claim 19, wherein managing the peripherals comprises enabling an audio or video peripheral on the first client computing device and disabling an audio or video peripheral on the second client computing device.

* * * * *